United States Patent [19]
Sydnor et al.

[11] Patent Number: 5,261,351

[45] Date of Patent: Nov. 16, 1993

[54] FIGURINE SWING

[76] Inventors: Norma Sydnor, 107 Gardner Lake Rd., Louisville, Ky. 40205; John M. Robertson, 8805 Charing Cross Rd., Louisville, Ky. 40222

[21] Appl. No.: 964,274

[22] Filed: Oct. 21, 1992

[51] Int. Cl.[5] .............................................. A01K 31/00
[52] U.S. Cl. ........................................ 119/23; 446/322
[58] Field of Search .................. 119/23; 446/322, 323; D30/111; D21/246

[56] References Cited
U.S. PATENT DOCUMENTS 1,360,470 11/1920 Swityk ................................ 446/322
2,966,762 1/1961 Hardaway et al. ............. 446/322 X

FOREIGN PATENT DOCUMENTS 614329 2/1961 Canada ................... 119/23

Primary Examiner—Robert P. Swiatek
Attorney, Agent, or Firm—Edward M. Steutermann

[57] ABSTRACT

A figurine and swing combination useful for various purposes where the figurine is adapted to be received on the swing and retained thereon by a fastener which allows defined relative movement between the figurine and the swing. Also cords are attached to the swing adjacent opposite ends thereof. The cords extend upwardly through cooperative apertures in the figurine to further attach the figurine to the swing yet allow relative movement between the swing and the figurine.

1 Claim, 1 Drawing Sheet

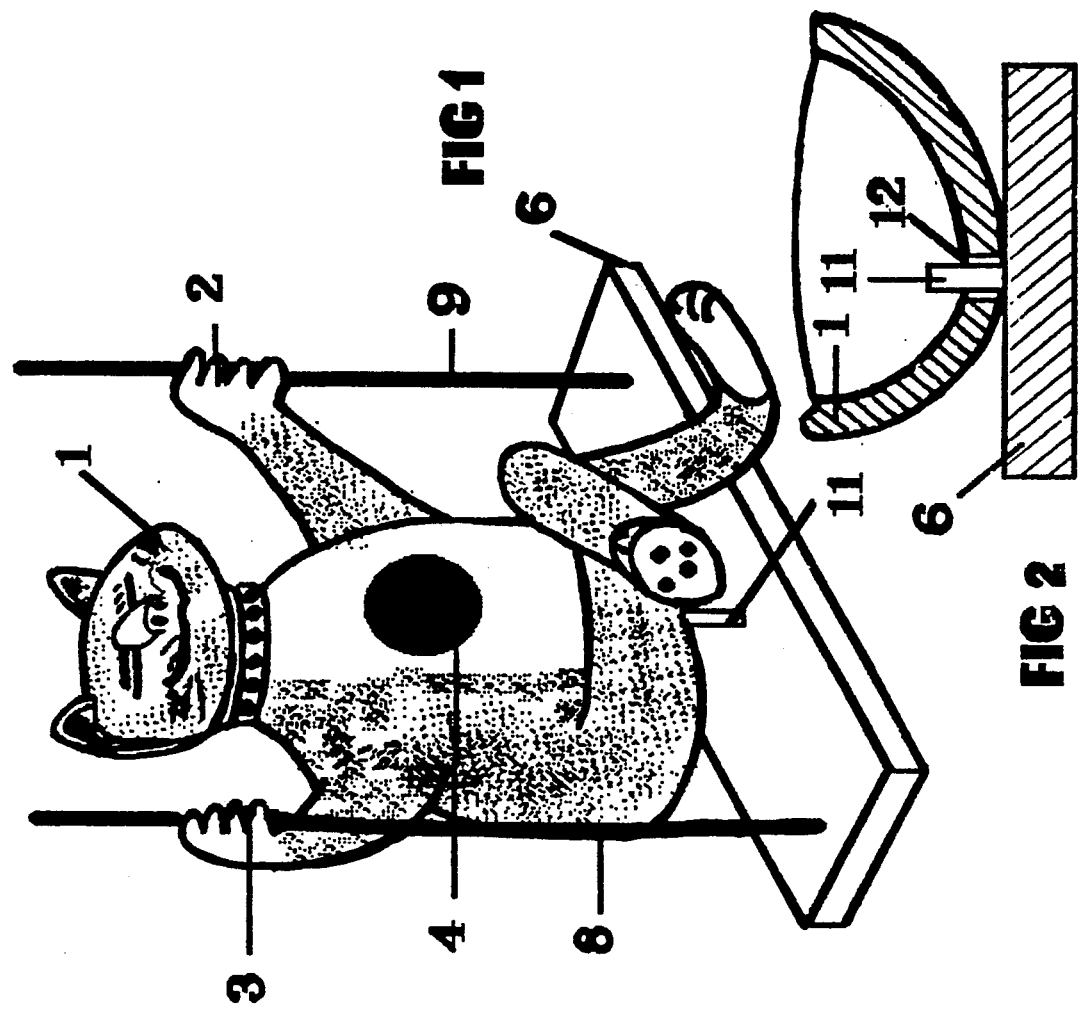

FIGURINE SWING

BACKGROUND OF THE INVENTION

The present invention relates in general to an ornamental device useful for selected purposes, for example as a birdhouse.

In addition, the present invention provides a unique decorative ornamental device wherein a figurine of selected appearance is adapted to be received on, and secured to, a swing to allow movement of the swing without damage to the figurine yet still retain the figurine on the swing.

Figurines of various types which can be adapted to useful purposes, including use as a birdhouse, are well known in the art. In general where such figurines have been adapted to also be used with means to suspend the figurines from a support so that the figurine also acts as a swing, the figurine and any swing seat or similar device have been formed as a single piece.

Such arrangements have been found to be fragile and the figurine subject to damage by movement of the assembly.

Additionally, such prior art devices have provided rigid means to attach the suspension means such as wires or cords to the figurine. This too has provided a source of breakage of the figurine in the event of rapid movement of the figurine, as in the event of high wind.

Moreover, because such prior art devices have utilized a swing and figurine formed as an entity, the ability to provide flexibility in the configuration of the devices is limited.

That is, because the figurines are molded as an entity, it is not possible to configure the assembly at the point of sale by utilizing a swing of one configuration with a figurine of another configuration. Thus a degree of flexibility in the appearance of the devices is lost.

No prior art arrangement is known which provides the features and advantages of devices provided within the scope of the present invention.

SUMMARY OF THE INVENTION

The present invention provides a unique, useful, and attractive figurine mounting means where the figurine is removably attached to a swing and where some freedom is provided for relative movement of the figurine on the swing in response to movement of the swing.

Devices within the scope of the present invention further provide the advantage that "mix and match" configuration of the devices can be utilized. That is, several different swing and figurine configurations can be provided to a sales location and the figurines and swings configured at the point of sale according to customer preference whereas any prior art devices which may bear any resemblance to devices within the scope of the present invention have been cast as a single piece and do not have the flexibility of devices within the scope of the present invention.

Moreover, devices within the scope of the present invention can be adapted to serve a useful as well as ornamental purpose.

For example devices within the scope of the present invention can be adapted for use as birdhouses.

In such applications it is also useful to be able to remove the figurine from the swing in order to clean the interior of the figurine.

Additionally, when devices of the type within the scope of the present invention are used as birdhouses the freedom of movement of the figurine relative to the swing, which is provided as described hereinbefore, decreases somewhat the likelihood of damage to birds or eggs in the device because the movement which may be experienced by the figurine is dampened by the flexible connection of the figurine to the swing.

Within the scope of the present invention various means can be utilized to flexibly connect the figurine to the swing. In one example, an upstanding pin is located on the swing and is received in a cooperative aperture provided in the figurine. Such an arrangement provides the maximum flexibility of movement of the figurine relative to the swing yet still retains the figurine on the swing.

A figurine and swing are also useful for purposes such as a birdhouse where the figurine is adapted to be received on the swing and retained thereon by fastener means which allow a defined relative movement between the figurine and the swing. Also cord means are attached to the swing adjacent opposite ends thereof and extend upwardly through cooperative apertures in the figurine to further attach the figurine to the swing yet allow relative movement.

Briefly, the present invention provides a figurine and swing combination useful for various purposes where the figurine is adapted to be received on the swing and retained thereon by fastener means which allow defined relative movement between the figurine and the swing. Also cord means are attached to the swing adjacent opposite ends thereof and extend upwardly through cooperative apertures in the figurine to further attach the figurine to the swing yet allow relative movement between the swing and the figurine.

One example of an arrangement within the scope of the present invention is illustrated herein and described hereinafter but it will be recognized that the illustrations and descriptions provided herein are by way of example only and that other arrangements also within the scope of the present invention will occur to those skilled in the art upon reading the disclosure set forth hereinafter.

BRIEF DESCRIPTION OF THE DRAWINGS

One example of an arrangement within the scope of the present invention is shown in the accompanying drawings wherein:

FIG. 1 illustrates, in perspective, an exploded view of a an example of a figurine and swing arrangement within the scope of the present invention: and FIG. 2 is a cross-sectional view illustrating one means for retaining the figurine on the swing member.

DETAILED DESCRIPTION OF THE DRAWINGS

Referring now to the drawing which illustrates one example of a device within the scope of the present invention, a figurine 1 in the form of a cat is illustrated.

While the Figure illustrates a cat shaped figurine it is to be understood that other shaped figurines are likewise included within the scope of the present invention. Additionally, it is not even required that the figurine be of any generally recognized shape.

Also in the arrangement shown in the Figure, an opening 4 is provided in the figurine and illustrates that the figurine can also be useful as a birdhouse. Again, while the figurine shown in FIG. 1 is useful as a birdhouse, figurines useful for other purposes, or no purposes at all, are likewise included within the scope of the present invention.

As previously discussed, the present invention encompasses the concept of the attachment of a figurine to a swing base to allow relative movement between the swing and the figurine to reduce the likelihood of damage to the figurine and to allow great flexibility in the assembly of figurines and swings.

Accordingly, as shown in the Figure, a swing base 6 is provided which generally planar and wide enough to accommodate the figurine 1.

In accordance with one feature of the present invention a fastener means is provided to connect the figurine to the swing base. Advantageously, the connecting means is capable of maintaining the figurine on the base yet allows relative movement of the base and figurine.

As shown in the Figures it is illustrated that it has been found that this objective can be accomplished by the use of a pin 11 which is adapted to be received in a cooperative aperture 12 shown in FIG. 2. In the arrangement shown the pin 11 is adequate to allow relative movement of the figurine on the base 6 but still retain the figurine. The movement is principally side to side but is sufficient to greatly reduce the likelihood of damage to the figurine in the event of sudden movement of the swing.

In addition to the use of pin 11 to secure figurine 1 to the swing, cords 8 and 9 are also provided. Cords 8 and 9 serve a dual purpose, namely to secure the assembly shown to a support (not shown) from which the assembly hangs and to act as guide means to restrain movement of the figurine on base 6.

As shown, cords 8 and 9 are received in apertures in the hands 2 and 3 of figurine 1. Advantageously, cords 8 and 9 are not restricted by the apertures of hands 2 and 3 so that in the event of movement of the figurine on base 1, the cords slide through the apertures in order to allow adjustment of the position of the figurine without stressing any part of the figurine.

FIG. 2 shows the figurine of FIG. 1 mounted on the base 2. In FIG. 2 the pin 11 is shown received in the aperture 12 provided in the base of the figurine so that the figurine is allowed a maximum degree of movement around the pin while the pin and the cords hold the figurine to the base.

As also shown, the bottom of the figurine can also have a rounded bottom to facilitate movement of the figurine on the base as required by movement of the swing. It has been recognized that devices of the type within the scope of the present invention provide movement and activity not generally available with any other known figurine assembly which can be used out of doors.

Again, while the figurine shown is in the form of a cat and it is convenient to run the cords through the hands of the figurine, it will be recognized that within the scope of the present invention other figurines can be used which may or may not have hands and that it is only necessary that the cords run through the devices to allow relative movement of the figurine and the base without causing great stress on the figurine.

Also, it will be understood that the foregoing illustrations and descriptions are by way of illustration only and that other arrangements also within the scope of the present invention will occur to those skilled in the art upon reading the disclosure set forth hereinbefore.

The invention claimed is:

1. A figurine and swing combination wherein the figurine is adapted to be received on the swing and retained thereon by fastener means which allow defined relative movement between the figurine and the swing wherein said figurine includes cooperative aperture means to receive cord means; said combination also including cord means attached to the swing adjacent opposite ends thereof and extended upwardly through said cooperative aperture means in the figurine to further attach the figurine and the swing and wherein said figurine has a cavity threin with an aperture provided to said cavity so said cavity can be used as a birdhouse.

* * * * *